United States Patent [19]

Aussedat

[11] Patent Number: 4,570,226

[45] Date of Patent: Feb. 11, 1986

[54] ECONOMICAL DRIVING INDICATOR DEVICE

[75] Inventor: Francis Aussedat, Saint-Cloud, France

[73] Assignee: Regie Nationale des Usines Renault, Boulogne-Billancourt, France

[21] Appl. No.: 433,092

[22] Filed: Oct. 6, 1982

[30] Foreign Application Priority Data

Oct. 7, 1981 [FR] France .................. 81 18871

[51] Int. Cl.⁴ .................. G06F 15/20; G09F 9/00
[52] U.S. Cl. .................. 364/442; 73/113; 340/754; 116/28 R
[58] Field of Search .................. 364/442; 340/718, 722, 340/753, 754; 73/113, 114; 116/28 R

[56] References Cited

U.S. PATENT DOCUMENTS

| | | | |
|---|---|---|---|
| 3,908,451 | 9/1975 | Walker et al. | 364/442 |
| 4,183,025 | 1/1980 | Kutaragi et al. | 340/753 |
| 4,197,650 | 4/1980 | Bailey et al. | 33/143 L |
| 4,210,908 | 7/1980 | Sakakibara | 340/754 |
| 4,223,297 | 9/1980 | Nomura et al. | 340/670 |
| 4,251,769 | 2/1981 | Ewert et al. | 340/753 |
| 4,291,295 | 9/1981 | Arnold | 340/670 |
| 4,293,843 | 10/1981 | Bertoloni et al. | 340/52 F |
| 4,415,891 | 11/1983 | Hay, III | 340/753 |
| 4,461,175 | 7/1984 | Baumgart et al. | 324/115 |
| 4,463,427 | 7/1984 | Bonnetain et al. | 364/442 |

FOREIGN PATENT DOCUMENTS 7881 2/1980 European Pat. Off. .

Primary Examiner—Errol A. Krass
Attorney, Agent, or Firm—Oblon, Fisher, Spivak, McClelland & Maier

[57] ABSTRACT

An economical driving indicator device for an automotive vehicle with an internal combustion engine, of the type indicating the instantaneous consumption of the vehicle per unit of distance traveled. The device monitors continuously the characteristics of the vehicle and transmits the monitored characteristics to a processing unit which determines the instantaneous real unit consumption, and the theoretical optimum unit consumption; and displays this information on a dial in the form of lighted areas composed of bar segments and an index indicating optimum consumption. The invention assists the driver in obtaining as economically as possible an optimum driving speed.

6 Claims, 3 Drawing Figures

ECONOMICAL DRIVING INDICATOR DEVICE

BACKGROUND OF THE INVENTION

1. Field of the Invention:

This invention relates to a device promoting economical operation of automotive vehicles with internal combustion engines driven over roads with varying profiles such as, in particular, roads in open countryside which in most countries still constitute the major portion of the route traveled by these vehicles.

2. Description of the Prior Art

Such devices of the above-noted type, commonly called "econometers," are already in existence in numerous versions and use electronic components to inform drivers of their instantaneous fuel consumption and encourage them, theoretically, to use slower starting speeds leading to a decrease in the instantaneous unit fuel consumption of the automotive vehicle equipped with the econometer.

Users of these econometers generally complain that these devices provide unrealistic measurements and above all, without actually admitting it, that they only teach the vehicle operator to reduce his instantaneous speed by taking his foot off the accelerator, i.e., by reducing the opening of the butterfly valve in the carburator of the engine or the amount of fuel injected.

To teach drivers to obtain the best performance from their vehicles, i.e., to obtain for the average speed chosen as a function of the possible delays in progress and the profile (slopes and turns) of the road over which they are traveling, the least possible fuel consumption without increasing wear on the vehicle and its engine, more sophisticated methods of furnishing data must be provided to the driver.

Such indicators to aid in economical driving have already been proposed for use on heavy road vehicles, accompanied by instruction by an economical driving monitor, but their proper use requires actual instruction and the presence of qualified personnel and cannot be extended to all the private vehicles for all driving conditions.

Among the reasons why the existing econometers provide unrealistic data on consumption despite a relatively high equipment and above all high installation fee, may be cited the fact that it is necessary to measure continuously and accurately the amount of fuel flowing to the engine, but this measurement is taken for a small and most often differential amount in the feed pumps and the injection pumps where part of the flow returns via a bypass to the fuel tank, which makes such measurements difficult and inaccurate.

SUMMARY OF THE INVENTION

Accordingly, one object of this invention is to provide a novel econometer which makes it truly possible to teach the driver how to operate his vehicle economically and which is free of the constraints involved in direct measurement of fuel flow.

To this end, there is provided an economical driving indicator device for an automotive vehicle with an internal combustion engine, which device indicates the instantaneous consumption of the vehicle per unit of distance traveled, characterized by continuously registering the following parameters concerning the vehicle:

the instantaneous speed of revolution of the engine;

the intake pressure of the engine or, in the case of a fuel injection and/or compression engine, the rate of air intake or the rate of acceleration of the engine and;

the instantaneous speed of displacement of the vehicle;

The device according to the invention transmits these registered values to a calculation unit which provides the following instantaneous data:

the instantaneous real unit consumption of the vehicle calculated for the driving conditions registered (engine revolution, intake depression, speed of displacement); and the theoretical least possible unit consumption of the vehicle traveling over a level surface at a steady speed calculated for the speed of displacement of the vehicle registered.

The device according to the invention displays these data on a dial in the form of:

a mobile display area composed of a group of lighted bars or segments which are juxtaposed and lighted up to the bar representing instantaneous unit consumption and of which the lighted portion on the dial represents the vehicle's instantaneous unit consumption in relation to a determined maximum value which can be registered, such as for example 20 liters/100 km; and a lighted display index indicating on the dial the theoretical minimum unit consumption of the vehicle traveling over a level surface at a steady speed equal to the instantaneous speed registered.

To realize the advantages of the econometer designed according to the invention which has just been explained, it must be recalled that the purpose of an economical operation indicator is as much a matter of teaching the driver the art of using his vehicle under the most economical fuel consumption and vehicle wear conditions as of providing information on instantaneous unit consumption which in any case is flawed by errors and rapid fluctuations due to the variations in the road profile and the driving conditions imposed by traffic. Indeed, it can easily be imagined that when the driver accelerates to start or to pass another vehicle, his unit consumption increases considerably and then returns to normal values when the acceleration is ended. Likewise, when the driver takes his foot off the accelerator to slow down or, a better example, when he goes into neutral during braking before a stop or a rolling stop imposed by the stoppage of traffic at a distance, the vehicle's rate of unit consumption becomes very small and, in all these aberrant cases, it is impossible to know whether the operation of the vehicle is close to the optimum for the same driving conditions. This optimum is defined, for example, as the driving done (gears used, rate of acceleration) by a driver who is fully aware of the problems of economical operation which can be described as the best compromise among the risks of vehicle wear, fuel consumption, driving time and driving safety.

The economical operation indicator device according to the invention includes a real unit consumption indicator which does not use a gauge for the rate of fuel flowing to the carburator of the injection pump but which uses, rather, by means of the calculation unit, the data registered continuously on speed of revolution of the engine, intake depression and speed of vehicle displacement measured, for example, at the transmission outlet, to calculate the vehicle's unit consumption based on a network of trial curves for the vehicle and its engine. These data on operation of the vehicle and its engine are easier to register and transform into reliable electrical magnitudes than the data on fuel flow. For teaching the driver how to drive economically, they have in addition the advantage of not including in the calculations engine wear and imperfections as compared to the engine of the ideal vehicle in perfect running condition. Thus, the driver learns to obtain the best performance from his vehicle such as it is, without being inhibited by the imperfections and inadequacies of that vehicle as compared to the ideal vehicle.

The luminous display indicators on the dial have a significant enough resolution to be clearly seen by using, for example, a different bar or segment for each unit of consumption of one liter of fuel consumed per 100 kilometers traveled. The optimum theoretical unit consumption on a level surface is displayed with the same sharpness and resolution as one liter of unit consumption and to better ensure its visibility, according to a design variation of the invention, the lighted index indicating the vehicle's minimum theoretical unit consumption is composed of one of the juxtaposed bars which corresponds to this minimum consumption and which appears in luminous contrast on the dial, i.e., light off if it is in the lighted area representing the real unit consumption and is therefore less than this real unit consumption, and, respectively, light on if it is outside this lighted area and therefore is greater than the calculated real unit consumption.

As has already been recalled, the resolution of the bars or segments corresponds to a unit of unit consumption such as liters of fuel consumed per 100 kilometers traveled, or miles per gallon of fuel used.

According to a very important design feature of the invention, the calculation unit also provides instantaneous data on the optimum gear which can be used to obtain minimum unit consumption for the operating conditions registered (engine and vehicle speed and intake depression) and displays on an auxiliary dial the number of this gear, for example in the form of a numeral in seven-segment digits.

The gear number calculated by the calculation unit and displayed on an auxiliary dial takes into account the capabilities of the engine and the instantaneous speed of the vehicle as well as the risks of premature engine wear and the driving comfort of the vehicle in traffic. Indeed, from the sole viewpoint of the vehicle's unit consumption it would suffice to display almost continuously the highest gear providing the smallest speed of engine revolution to obtain minimum unit consumption.

The calculation unit's flexibility of discrimination in determining the gear which represents the best compromise among low consumption, engine wear and driving comfort gives the driver of the vehicle confidence in the correctness of the choice of gear suggested by the calculation unit. In order to avoid errors in assessment which would interfere with driving comfort in this gear range the indicator for the optimum gear does not light up when the vehicle is moving slowly, for example at a speed of less than 20 kilometers per hour. The same is true of the indicators for calculated optimum and real consumption.

According to a preferred embodiment of the economical driving indicator device, the instantaneous data on the vehicle are registered in the form of:

an electrical signal indicative of engine speed, preferably in proportion to the speed of revolution of the engine;

an electrical signal indicative of pressure, the frequency of which is proportional to the intake pressure of the engine;

an electrical signal indicative of speed of the vehicle, the frequency of which is proportional to the speed of the vehicle;

and, firstly, the calculation unit which is controlled by a program stored in a memory converts the frequencies of the electrical signals into the corresponding values with which it calculates, using a correspondence table stored in memory, based on the pressure and speed of revolution of the engine:

the instantaneous flow of fuel;

the instantaneous real unit consumption of the vehicle based on the instantaneous data received and the actual speed of the vehicle;

the calculated minimum theoretical unit consumption of the vehicle traveling over a level surface at a steady speed equal to the instantaneous speed registered;

if appropriate, the optimum gear which can be used, and secondly, the calculation unit displays electrically and/or electronically on one or several visual displays such as dials, the unit consumption values (instantaneous real and minimum theoretical), as well as, if appropriate, the optimum gear which can be used.

According to an embodiment of the invention which allows the driver to compare his driving with theoretical ideal driving, the calculation unit is equipped with summation and/or integration functions to calculate, in the distance traveled by the vehicle from an initialization point, the instantaneous indications of the unit consumptions:

calculated instantaneous real unit consumption and calculated minimum theoretical unit consumption, and with memory functions for the result of the addition and/or integration processes and display functions for this result expressed in fuel volume or weight:

calculated real volume or weight calculated theoretical minimum volume or weight, consumed since departure from the initialization point. This display is shown continuously or, if such be the case, at the request of the driver in order to allow him to compare the total calculated real consumption of his vehicle over the distance traveled with the total minimum theoretical consumption calculated for the same vehicle speed conditions and over the same distance measured as if it were a level surface.

To compare the total consumptions (calculated real and theoretical) over a given distance, the calculation unit can also be equipped with functions for summation and/or integration over time from an initialization point of the real calculated instantaneous fuel rate and, respectively, the minimum theoretical instantaneous rate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
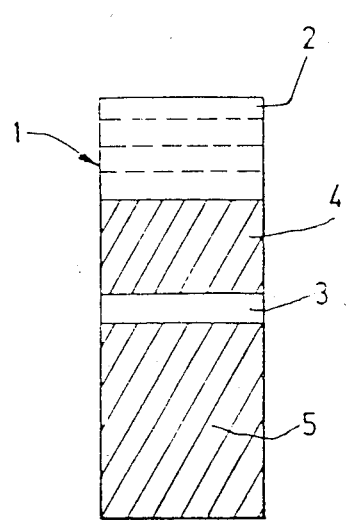
FIG. 1 represents a visual display dial for the calculated real and optimum theoretical unit consumptions in the usual case where the latter is less than the calculated real consumption.

Referring now to the drawings, wherein like reference numerals designate identical or corresponding parts throughout the several views.

Figure 2:
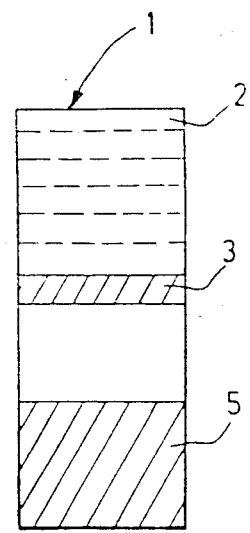
FIG. 2 represents the same dial in the exceptional case where the calculated real consumption is less than the optimum minimum consumption.

FIGS. 1 and 2 each represent the visual display dial of the indicator in a rectangular shape which is called a "bar graph". This dial 1 is generally composed of approximately 20 horizontal bars 2, each representing a unit consumption of one liter of fuel per 100 kilometers traveled. Each bar 2 can be lighted by an electro-optical device such as a liquid crystal display LCD or an LED.

For example, to show an instantaneous unit consumption of 7 liters/100 km, the seven lower horizontal bars are lighted and the driver can learn, at a glance, what his instantaneous unit consumption is by comparing the height of the lighted area with the total height of the dial, the corresponding unit consumption can also be shown on each bar.

FIG. 1 shows a series of bars lighted from the base of the dial, the number of lighted bars being, for example, 16, to represent an instantaneous unit consumption of 16 liters/100 km. The driver cannot count the number of lighted bars but he can see by overall comparison that approximately ¾ of the dial surface is lighted and that if unit consumption when the entire dial is lighted is 20 l/100 km, his instantaneous consumption is close to 15 l/100 km. At the same time, the driver notes the portion of an unlighted bar 3 which represents, in contrast, the minimum theoretical unit consumption of the vehicle traveling at the same instantaneous speed but at a steady speed and over a level surface. This theoretical unit consumption is 10 liters/100 km which the driver notes by the position of the bar 3 approximately in the center of the dial 1.

The driver can also note the theoretical excess consumption as compared to the theoretical ideal by estimating the height 4 of the lighted bands above the bar 3. The relative height in relation to the dial of lighted bars 5 below the bar 3 makes it possible to note the value of minimum theoretical consumption. To obtain a small fuel consumption, the driver must make an effort to reconcile as much as possible and for as long as possible the upper portion 4 of the lighted area on the dial 1 of the "bar graph" with the bar 3 representing theoretical minimum consumption.

FIG. 2 represents an indicator on the bar graph which shows an instantaneous unit consumption that is less than the minimum theoretical consumption. The situation in FIG. 2 is encountered only for short periods but it is not aberrant. It corresponds in particular to the case where the vehicle is traveling at a relatively high speed while the driver no longer has his foot on the accelerator because the vehicle is going downhill or is decelerating by engine braking or while traveling straight ahead following declutching or a shift into neutral.

The bar 3 representing theoretical unit consumption is shown in FIG. 2 approximately at the 11 liters/100 km level and appears clearly lighted above the limits 5, which are lighted in the lower portion of the dial and which represent a calculated real consumption of approximately 6 liters/100 km corresponding to the movement of the vehicle traveling downhill at a relatively high speed of deceleration.

The driver who makes intelligent use of the bar graph according to the invention will not fail to associate the data provided with the profile of the road on which he is traveling at the moment of measurement. Thus, he will accept as normal surplus unit consumption by the vehicle when it is climbing a grade or accelerating and will not conclude that he is driving especially economically when it is going down a hill. It should be noted in this regard that the indication of calculated instantaneous unit consumption is affected by the measurement of the pressure or, if such is the case, the rate of air intake or rate of acceleration of the engine, whereas the calculation of minimum theoretical consumption is affected only by the instantaneous speed of the vehicle. In the case of a vehicle equipped with a diesel engine, since the rate of air intake is insignificant, an indication of the position of the accelerator which corresponds closely to a defined amount of fuel per revolution of the engine can be used as an indication of the rate of acceleration of the engine.

As has already been stated, a very important element in teaching the driver to drive economically with the help of the bar graph according to the invention is constituted by the recommended gear indicator. Thus, for a modern automotive vehicle equipped with a five-speed transmission up front, as soon as the vehicle is moving at speeds on the order of 70 to 80 km/h with moderate intake pressure the driver sees the indication "5" appear on the auxiliary dial 25 for recommended gears (FIG. 3) which reminds him that minimum consumption can be obtained by shifting into fifth gear.

This indication of recommended gears is not aberrent, because it is corrected by the calculation unit as a function of the intake pressure or, in the case of fuel-injection engines, the rate of air intake and, in the case of diesel engines, the position of the accelerator which controls the rate of fuel intake by piston movement. Thus, in the vehicle just described which has a five-speed transmission, when the driver wants the carburator open wide in order to pass another vehicle, at a speed of 90 km/h for example, the indicator light for the recommended gear goes out and the driver can use, for example, the third gear to make the vehicle's engine turn over at high speed and obtain great acceleration. As soon as the driver has passed the other vehicle and takes his foot off the accelerator, the indicator light for the fifth gear appears, reminding the driver that really economical driving at this speed is done in fifth gear and not fourth, which is, however, more comfortable for going over the little rises in the road.

For the reliability and credibility of the data provided by the economical driving indicator on consumption as well as on gears, the indicator lights of the device go out when the vehicle is traveling at low speed, for example at less than 20 km/h, where they would be meaningless.

Figure 3:
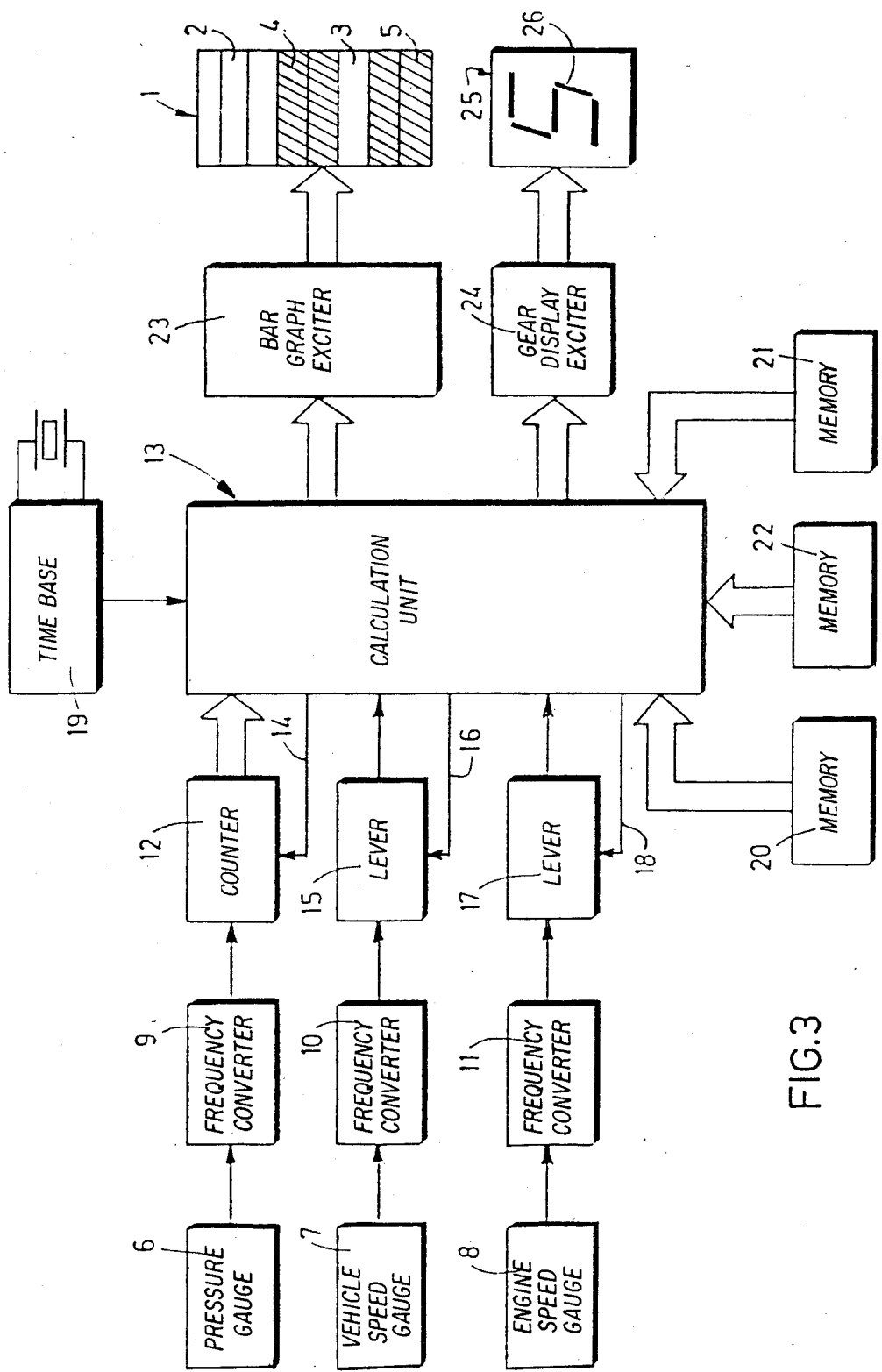
FIG. 3 is a logical block diagram of the economical driving indicator according to the invention.

FIG. 3 represents the complete schematic structure of the economical driving indicator device equipped with the "bar graph" dial for reading unit consumption, the indications of which are described in FIGS. 1 and 2.

Gauges for, respectively, pressure 6, vehicle speed 7 and engine speed 8 are connected to the corresponding frequency converters 9,10,11 which convert the frequency of the electrical signals of these gauges into, respectively, values of:

pressure (for example from 0 to 600 millimeters of mercury) integrated by an external counter 12 which is read periodically by a calculator 13 that periodically returns it to zero using an updating line 14;

vehicle speed within a range of 0 to 180 km/h, for example, that activates a lever 15 which is connected to the calculation unit 13 and which is periodically returned to zero by an updating line 16;

engine speed within a range of 0 to 6000 rpm, for example, that triggers a lever 17 which is connected to the calculation unit 13 and which is periodically returned to zero by an updating line 18.

The calculation unit 13 which constitutes the core of the indicator device is connected to a time base 19 and a memory program 20 as well as to an on-line external memory 21. To calculate instantaneous real consumption and minimum theoretical consumption, the calculation unit 13 is also connected to a value table memory 22 which corresponds to a network of measurement curves relative to the type of engine in the vehicle and which make it possible to calculate for a given engine speed and a given intake collector pressure (or, respectively, a given accelerator position in the case of a diesel engine), the rate of fuel consumption in liters/hour. These curves are represented in the memory 22 by a table of rates in liters/hour as a function of pressure and the number of engine revolutions for approximately 200 to 300 different points. The calculation unit 13 calculates the instantaneous rate of fuel flow by linear interpolation based on four values surrounding the point to be determined. Based on instantaneous fuel consumption per hour, the calculation unit 13 determines from the data on vehicle speed provided by the gauge 7 giving, for example, the number of revolutions per minute of the primary shaft of the transmission, the instantaneous unit consumption of the vehicle transmitted to an exciter 23 of the bar graph 1.

The calculation unit also continuously calculates, as a function of the vehicle speed indication provided by the gauge 7 and a curve for consumption at a steady speed stored in the memory 22 in the form of an appended table, the theoretical minimum consumption and displays it by means of the exciter 23 on the bar 3 of the bar graph 1.

The recommended gear indication is also calculated by the calculation unit 13 and displayed by means of an exciter 24 which causes the number 26 of the recommended gear to be displayed clearly on an auxiliary dial 25 using a seven-segment digit. The figure shows that the auxiliary dial 25 advises the driver to use the fifth gear of the transmission.

In order to calculate the recommended gear, the calculation unit firstly determines the gear which the driver's vehicle is in by calculating the ratio between the number of revolutions of the secondary shaft of the transmission and the number of revolutions of the engine. The calculation unit then compares the reduction or multiplication ratio of the transmission with a table of engine charge correspondence and determines whether or not it is necessary to recommend the use of a gear other than the one being used by the driver. In order to properly attract the driver's attention, the auxiliary dial 25 does not light up if the gear being used by the driver is correct and lights up only if another gear is recommended. As soon as the driver has shifted into the recommended gear, the light on the dial 25 goes out. The indicator lights on the dial 25 are not oriented solely toward best consumption. For example, in the event that a driver traveling at a moderate speed in fifth gear accelerated rapidly, to pass another vehicle for example, the dial 25 lights up and advises the driver to use the fourth gear, and if the acceleration is very fast and the vehicle speed is limited (80 km/h for example) the dial 25 may recommend shifting down again to pass more safely in third gear.

When the driver has taken his foot off the accelerator, which may be indicated by a sharp drop in intake, the recommended gear indicator light will preferably be out, since it would interfere with the operation of the vehicle in accordance with the safety rules. Such a case occurs when a vehicle is traveling downhill and generally speaking when the driver uses the engine brake to decelerate economically while leaving open the possibility of rapid reacceleration.

The bar graph, i.e., dial 1 and dial 25 which are controlled by the calculation unit via the exciters 23 and 24, represents the link between the driver and the calculation unit and must be readable in all driving situations (daylight, bright sunlight, nighttime, city driving) without interfering with vehicle operation.

The indicators on these dials 1 and 25 can be built using LED on LCD technology.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An economical driving indicator device for an automotive vehicle with an internal combustion engine, said device indicating the instantaneous consumption of the vehicle per unit of distance traveled, comprising:

means for monitoring selected parameters indicative of operation of the vehicle for producing data indicative of the monitored parameters, said monitored parameters including the instantaneous speed of revolution of the engine, the instantaneous speed of displacement of the vehicle and at least a parameter selected from the group consisting of the intake pressure of the engine and in the case of a fuel injection and/or compression engine the rate of air intake or the rate of acceleration of the engine;

processing means coupled to said monitoring means for computing the following instantaneous data based on the monitored parameters;

an instantaneous real unit consumption of the vehicle calculated for the registered driving conditions (speed of revolution of the engine, intake pressure, speed of the vehicle), a minimum possible theoretical unit consumption of the vehicle traveling over a level surface at a steady speed calculated for the registered speed of displacement of the vehicle; and display means, coupled to said processing means, including a dial for displaying the computed instantaneous data, comprising, said dial having a variable display area composed of a group of display segments which are juxtaposed, wherein selected of said segments are illuminated up to a segment representing instantaneous consumption and of which the illuminated display segments represent an instantaneous unit consumption of the vehicle in relation to a predetermined maximum value which can be registered, and a display index indicating on the dial a minimum theoretical unit consumption of the vehicle traveling over a level surface at a steady speed equal to the monitored instantaneous speed;

the display index indicating the minimum theoretical unit consumption of the vehicle being composed of one of the juxtaposed segments which corresponds to said minimum consumption and which appears in luminous contrast on the dial, i.e., unilluminated if it is within the illuminated display segments representing real unit consumption and is therefore less than said real unit consumption, and respectively illuminated if it is outside said illuminated display segments and is therefore greater than the calculated real unit consumption.

2. An indicator device according to claim 1, comprising:

said segments of said display area defining a resolution corresponding to a unit of unit fuel consumption per unit distance traveled.

3. An indicator device according to claim 2, comprising:

said processing means including means for computing instantaneous data on an optimum gear which can be used to obtain minimum unit fuel consumption per unit distance traveled for the monitored operating conditions; and said display means comprising an auxiliary dial displaying the number of said optimum gear.

4. An indicator device according to claim 3, comprising:

said monitoring means comprising means for generating based on the monitored parameters respective electrical signals, including:

an electrical signal indicative of engine speed and having a frequency proportional to the speed of revolution of the engine, an electrical signal indicative of pressure and having a frequency proportional to the intake depression of the engine, an electrical signal indicative of vehicle speed and having a frequency proportional to the speed of the vehicle;

said processing means including a program memory and a table memory and being controlled by a program stored in the program memory to convert the frequencies of the electrical signals into corresonding values which are used in addition to the contents of said table memory to compute, based on the pressure and the speed of revolution of the engine, the following:

the instantaneous fuel flow, the instantaneous real unit fuel consumption of the vehicle calculated based on the instantaneous data received and the real speed of the vehicle, the minimum theoretical unit fuel consumption of the vehicle traveling on a level surface at a steady speed equal to the instantaneous speed registered, and the optimum gear which can be used;

said display means comprising means for displaying instantaneous real and minimum theoretical unit fuel consumption values as well as the optimum gear which can be used.

5. An indicator device according to claim 4, wherein said processing means comprises:

means for performing summation functions to calculate, over the distance traveled by the vehicle from an initialization point, instantaneous indications of unit fuel consumption, including, calculated real instantaneous unit fuel consumption, and calculated minimum theoretical unit fuel consumption, and means for memorizing the result of the summing function; and said display means including means for displaying the result of the summing function as fuel volume or weight, including calculated real volume or weight, and calculated minimum theoretical volume or weight, consumed since departure from the initialization point, in order to allow a driver to compare a total calculated real fuel consumption over the distance traveled with a total minimum theoretical fuel consumption calculated for the same vehicle speed conditions and over the same distance treated as if it were a level surface.

6. An indicator device according to claim 5, comprising:

said processing means including means performing summation functions over time from an initialization moment of the real calculated instantaneous fuel consumption rate and the minimum theoretical instantaneous fuel consumption rate, and for performing a memory storage function for storing the results of the summation; and said display means comprising means for displaying the summation results as fuel volume or fuel weight in the form of:

calculated real volume or weight, and calculated theoretical minimum volume or weight, consumed since departure from the initialization point, with the summation results being displayed in order to enable the drive to compare the total calculated real consumption over the distance traveled with the minimum theoretical consumption calculated for the same vehicle speed conditions and over the same distance treated as if it were a level surface.

* * * * *